United States Patent
Dorum

(10) Patent No.: US 9,911,332 B1
(45) Date of Patent: Mar. 6, 2018

(54) METHOD, APPARATUS, AND COMPUTER PROGRAM PRODUCT FOR PARKING LIKELIHOOD ESTIMATION BASED ON PROBE DATA COLLECTION

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 23 days.

(21) Appl. No.: 15/449,145

(22) Filed: Mar. 3, 2017

(51) Int. Cl.
*B60Q 1/48* (2006.01)
*G08G 1/14* (2006.01)
*G08G 1/01* (2006.01)
*G08G 1/052* (2006.01)
*G08G 1/056* (2006.01)

(52) U.S. Cl.
CPC ............. *G08G 1/143* (2013.01); *G08G 1/012* (2013.01); *G08G 1/052* (2013.01); *G08G 1/056* (2013.01)

(58) Field of Classification Search
CPC ........ G08G 1/143; G08G 1/056; G08G 1/052; G08G 1/012
USPC ............. 340/632.2, 905, 426.2, 937, 995.24; 701/23, 28, 118, 408, 423, 454
See application file for complete search history.

(56) References Cited

U.S. PATENT DOCUMENTS

| | | | |
|---|---|---|---|
| 8,543,320 B2 | 9/2013 | Zheng et al. | |
| 8,606,499 B2 | 12/2013 | Li et al. | |
| 8,963,740 B2 * | 2/2015 | Koukoumidis | ........ G08G 1/141 340/426.2 |
| 9,355,063 B2 | 5/2016 | Scharmann et al. | |
| 2008/0021638 A1 | 1/2008 | Kobayashi | |
| 2009/0143979 A1 | 6/2009 | Sakata | |
| 2013/0131980 A1 | 5/2013 | Ginsberg | |
| 2013/0211699 A1 | 8/2013 | Scharmann et al. | |
| 2016/0225255 A1 * | 8/2016 | Thakur | ................. G08G 1/0112 |
| 2016/0239983 A1 * | 8/2016 | Dorum | .................... G06T 11/20 |

FOREIGN PATENT DOCUMENTS

CN 105810006 A 7/2016

OTHER PUBLICATIONS

Cao, Lili et al.; "From GPS Traces to a Routable Road Map"; Conference: 17th ACM SIGSPATIAL International Symposium on Advances in Geographic Information Systems, ACM-GIS 2009, Nov. 4-6, 2009, Seattle, Washington, USA, Proceedings; pp. 1-10.

\* cited by examiner

*Primary Examiner* — Dhaval Patel
(74) *Attorney, Agent, or Firm* — Alston & Bird LLP

(57) ABSTRACT

A method, apparatus, and computer program product are provided for estimating parking likelihood in an area based on probe data points. A method may include: receiving probe data points associated with a plurality of vehicles; determining location data, heading data, and speed data from each probe data point; categorizing a probe data point as a driving probe data point in response to the heading data corresponding with heading data of a road proximate the location of the probe data point and the speed data of the probe data point being above a predefined value; categorizing a probe data point as a parking probe data point in response to the heading data failing to correspond with heading data of a road; determining a ratio of driving probe data points to parking probe data points; and providing an indication of parking locations in at least one region of a map in response to the parking likelihood for the locations satisfying a predetermined criteria.

28 Claims, 6 Drawing Sheets

METHOD, APPARATUS, AND COMPUTER PROGRAM PRODUCT FOR PARKING LIKELIHOOD ESTIMATION BASED ON PROBE DATA COLLECTION

TECHNOLOGICAL FIELD

An example embodiment of the present invention relates to estimating the existence and location of parking, and more particularly, to using historical vehicle probe data to establish the location of vehicle parking spaces based on vehicle probe data.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services.

BRIEF SUMMARY

A method, apparatus, and computer program product are provided in accordance with an example embodiment described herein for establishing the location of vehicle parking spaces based on vehicle probe data. In an example embodiment, a mapping system is provided including: a memory including map data and processing circuitry. The processing circuitry may be configured to: receive probe data points associated with a plurality of vehicles; determine location data, heading data, and speed data from each probe data point; categorize a probe data point as a driving probe data point in response to the heading data corresponding with heading data of a road of the map data proximate the location data of the probe data point and the speed data of the probe data point being above a predefined value; categorize a probe data point as a parking probe data point in response to the heading data failing to correspond with heading data of a road proximate the location data of the probe data point; determine a ratio of probe data points categorized as driving relative to probe data points categorized as parking; generate a parking likelihood based on the ratio; and provide an indication of parking locations in at least one region of a map in response to the parking likelihood for the parking locations satisfying a predetermined criteria. Categorizing a probe data point as a parking probe data point may be performed in response to the speed data of the probe data point being below a second predefined value.

According to some embodiments, determining a ratio of probe data points categorized as driving relative to probe data points categorized as parking is performed on probe data points having location data corresponding to within a predetermined radius of a given location. Providing an indication of parking locations in at least one region of a map includes visually distinguishing indications of the parking locations based on the parking likelihood. The visual distinction may include colors representing the respective parking likelihood. Determining a ratio of probe data points categorized as driving relative to probe data points characterized as parking includes dividing the number of probe data points categorized as parking by a total of the number of probe data points categorized as parking and a number of probe data points categorized as driving. Categorizing a probe data point as a driving probe data point in response to heading data corresponding with heading data of a road segment proximate to the location data of the probe data point may include categorizing a probe data point as a driving probe data point in response to heading data of the probe data point being within a predefined measure of heading data of a road segment within a predetermined distance from the location data of the probe data point.

Embodiments described herein may provide an apparatus including at least one processor and at least one memory including computer program code. The at least one memory and computer program code may be configured, with the processor, to cause the apparatus to: receive probe data points associated with a plurality of vehicles, determine location data, heading data, and speed data from each probe data point; categorize a probe data point as a driving probe data point in response to the heading data corresponding with heading data of a road proximate the location data of the probe data point and the speed data of the probe data point being above a predefined value; categorize a probe data point as a parking probe data point in response to the heading data failing to correspond with heading data of a road proximate the location data of the probe data point; determine a ratio of probe data points categorized as driving relative to probe data points categorized as parking; generate a parking likelihood based on the ratio; and provide an indication of parking locations in at least one region of a map in response to the parking likelihood for the parking locations satisfying a predetermined criteria. Causing the apparatus to categorize a probe data point as a parking probe data point may be performed in response to the speed data of the probe data point being below a second predefined value.

According to some embodiments, causing the apparatus to determine a ratio of probe data points categorized as driving relative to probe data points categorized as parking may be performed on probe data points having location data corresponding to within a predetermined radius of a given location. Causing the apparatus to provide an indication of parking locations in at least one region of a map includes causing the apparatus to visually distinguish indications of the parking locations based on their respective parking likelihood. The visual distinction may include colors representing the respective parking likelihood. Causing the apparatus to determine a ratio of probe data points categorized as driving relative to probe data points categorized as parking may include causing the apparatus to divide the number of probe data points categorized as parking by a total of the number of probe data points categorized as parking and a number of probe data points categorized as driving. Causing the apparatus to categorize a probe data point as a driving probe data point in response to heading data corresponding with heading data of a road segment proximate to the location data of the probe data point may include causing the apparatus to categorize a probe data point as a driving probe data point in response to heading data of the probe data point being within a predefined measure of heading data of a road segment within a predetermined distance from the location data of the probe data point.

Embodiments of the present invention may provide a computer program product including at least one non-transitory computer-readable storage medium having computer-executable program code portions stored therein. The computer-executable program code portions including program code instructions configured to: receive probe data points associated with a plurality of vehicles; determine location data, heading data, and speed data from each probe data point; categorize a probe data point as a driving probe data point in response to the heading data corresponding with the heading data of a road proximate the location data of the probe data point and the speed data of the probe data point being above a predefined value; categorize a probe data point as a parking probe data point in response to the heading data failing to correspond with heading data of a road proximate the location data of the probe data point; determine a ratio of probe data points categorized as driving relative to probe data points categorized as parking; generate a parking likelihood based on the ratio; and provide an indication of parking locations in at least one region of a map in response to the parking likelihood for the parking locations satisfying a predetermined criteria. The program code instructions to categorize a probe data point as a parking probe data point may be performed in response to the speed data of the probe data point being below a second predefined value.

According to some embodiments, the program code instructions to determine a ratio of probe data points categorized as driving relative to probe data points categorized as parking are performed on probe data points having location data corresponding to within a predetermined radius of a given location. The program code instructions to provide an indication of parking locations in at least one region of a map includes program code instructions to visually distinguish indications of the parking locations based on their respective parking likelihood. The visual distinction may include colors representing the respective parking likelihood. The program code instructions to determine a ratio of probe data points categorized as driving relative to probe data points categorized as parking may include program code instructions to divide a number of probe data points categorized as parking by a total number of the probe data points categorized as parking and a number of probe data points categorized as driving. The program code instructions to categorize a probe data point as a driving probe data point in response to heading data corresponding with heading data of a road segment proximate to the location data of the probe data point may include program code instructions to categorize a probe data point as a driving probe data point in response to heading data of the probe data point being within a predefined measure of heading data of a road segment within a predetermined distance from the location data of the probe data point.

Embodiments of the present invention may provide a method for determining parking likelihood, where the method may be implemented by a processor including memory and computer program code. The method may include: receiving probe data points associated with a plurality of vehicles; determining location data, heading data, and speed data from each probe data point; categorizing a probe data point as a driving probe data point in response to the heading data corresponding with heading data of a road proximate the location of the probe data point and the speed data of the probe data point being above a predefined value; categorizing a probe data point as a parking probe data point in response to the heading data failing to correspond with heading data of a road proximate the location data of the probe data point; determining a ratio of probe data points categorized as driving relative to probe data points categorized as parking; generating a parking likelihood based on the ratio; and providing an indication of parking locations in at least one region of a map in response to the parking likelihood for the locations satisfying a predetermined criteria. Categorizing a probe data point as a parking probe data point may be performed in response to the speed data of the probe data point being below a second predefined value.

According to some embodiments, determining a ratio of probe data points categorized as driving relative to probe data points categorized as parking may be performed on probe data points having location data corresponding to within a predetermined radius of a given location. Providing an indication of parking locations in at least one region of a map includes visually distinguishing indications of the parking locations based on the parking likelihood. The visual distinction may include colors representing the respective parking likelihood. Determining a ratio of probe data points categorized as driving relative to probe data points categorized as parking may include dividing a number of probe data points categorized as parking by a total of the number of probe data points categorized as parking and a number of probe data points categorized as driving. Categorizing a probe data point as a driving probe data point in response to heading data corresponding with heading data of a road segment proximate to the location data of the probe data point may include categorizing a probe data point as a driving probe data point in response to heading data of the probe data point being within a predefined measure of heading data of a road segment within a predetermined distance from the location data of the probe data point.

BRIEF DESCRIPTION OF THE DRAWINGS

Figure 1:
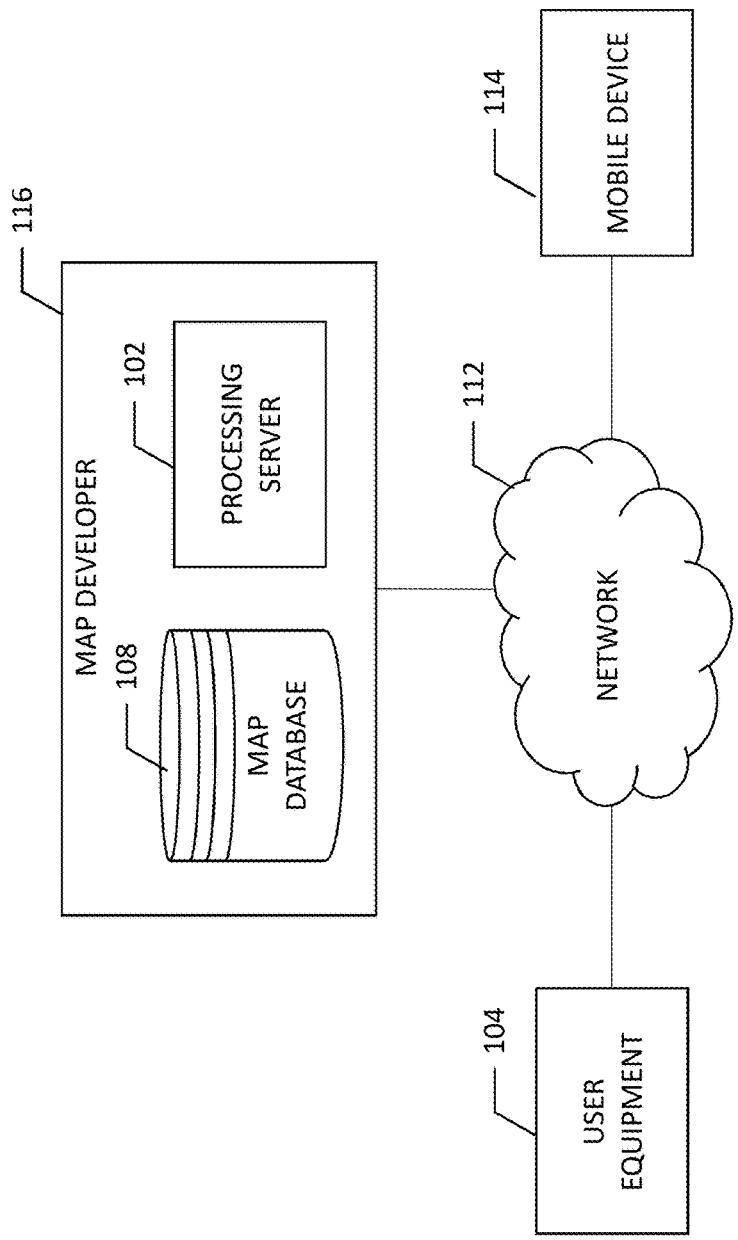
Figure 2:
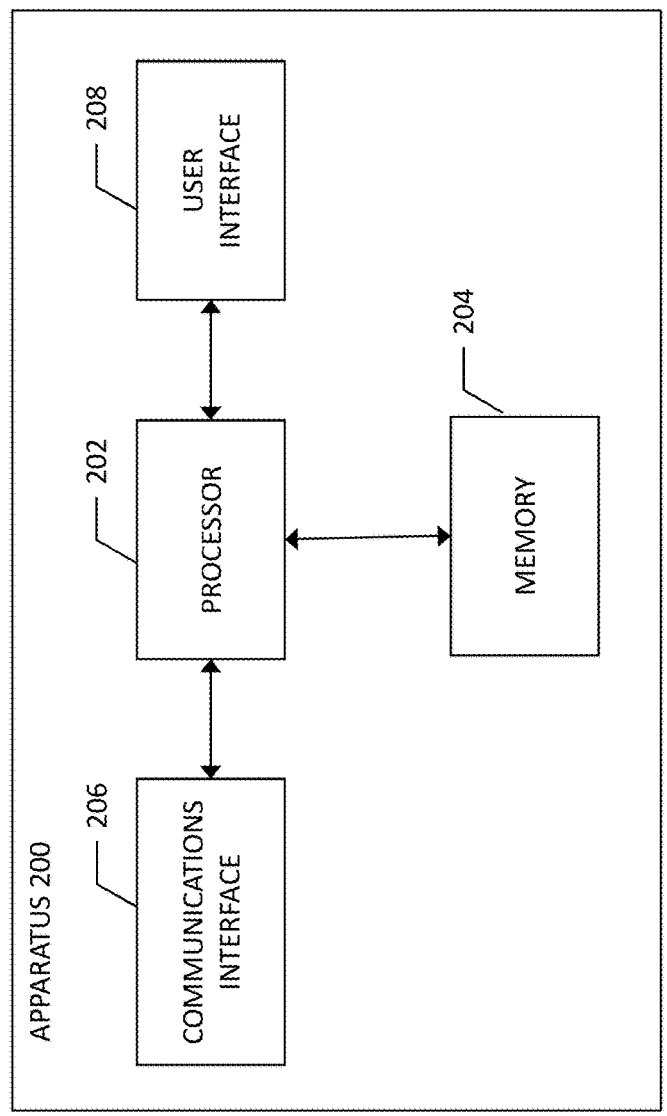
Figure 3:
Figure 4:
Figure 5:
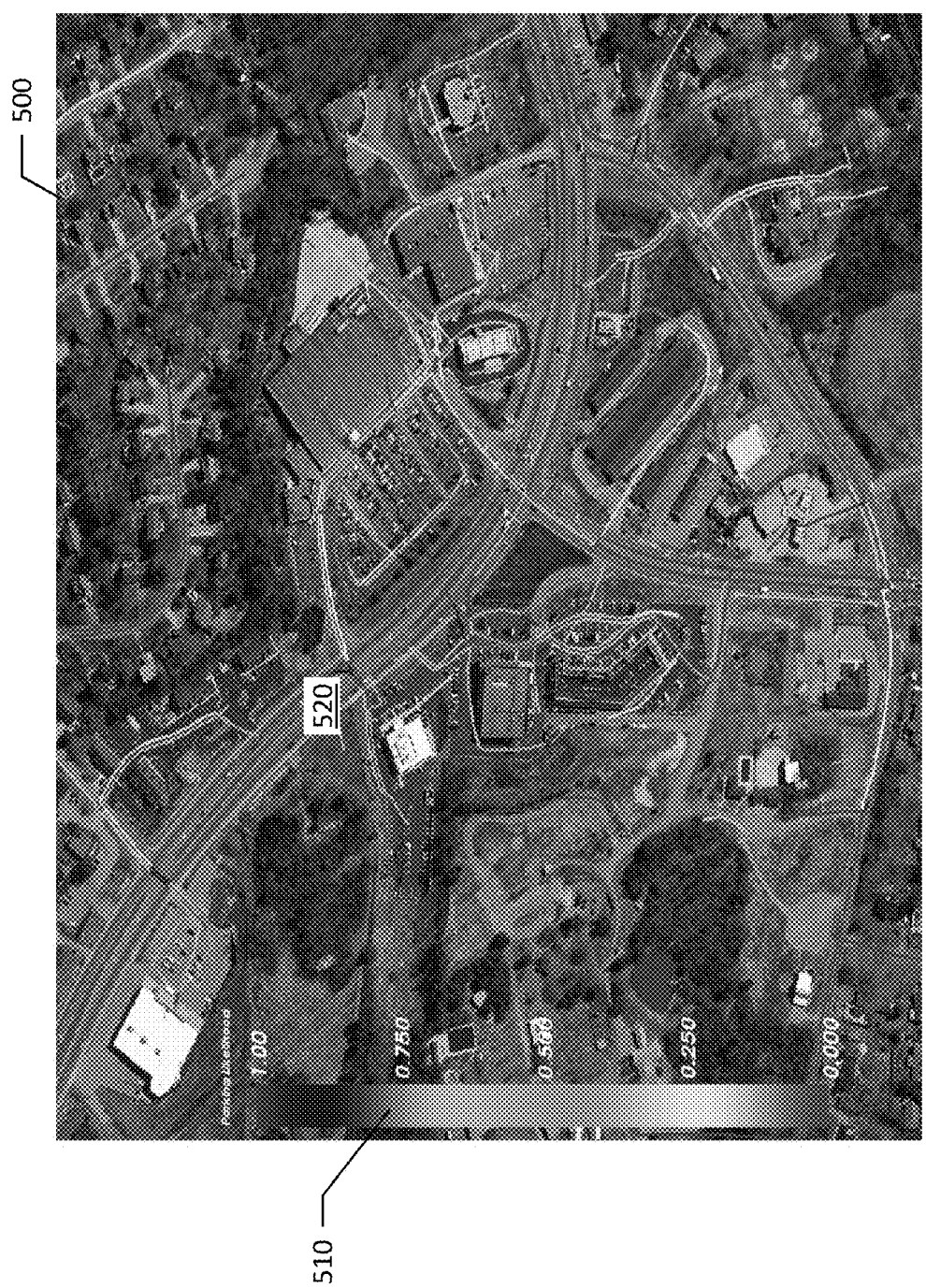
Figure 6:
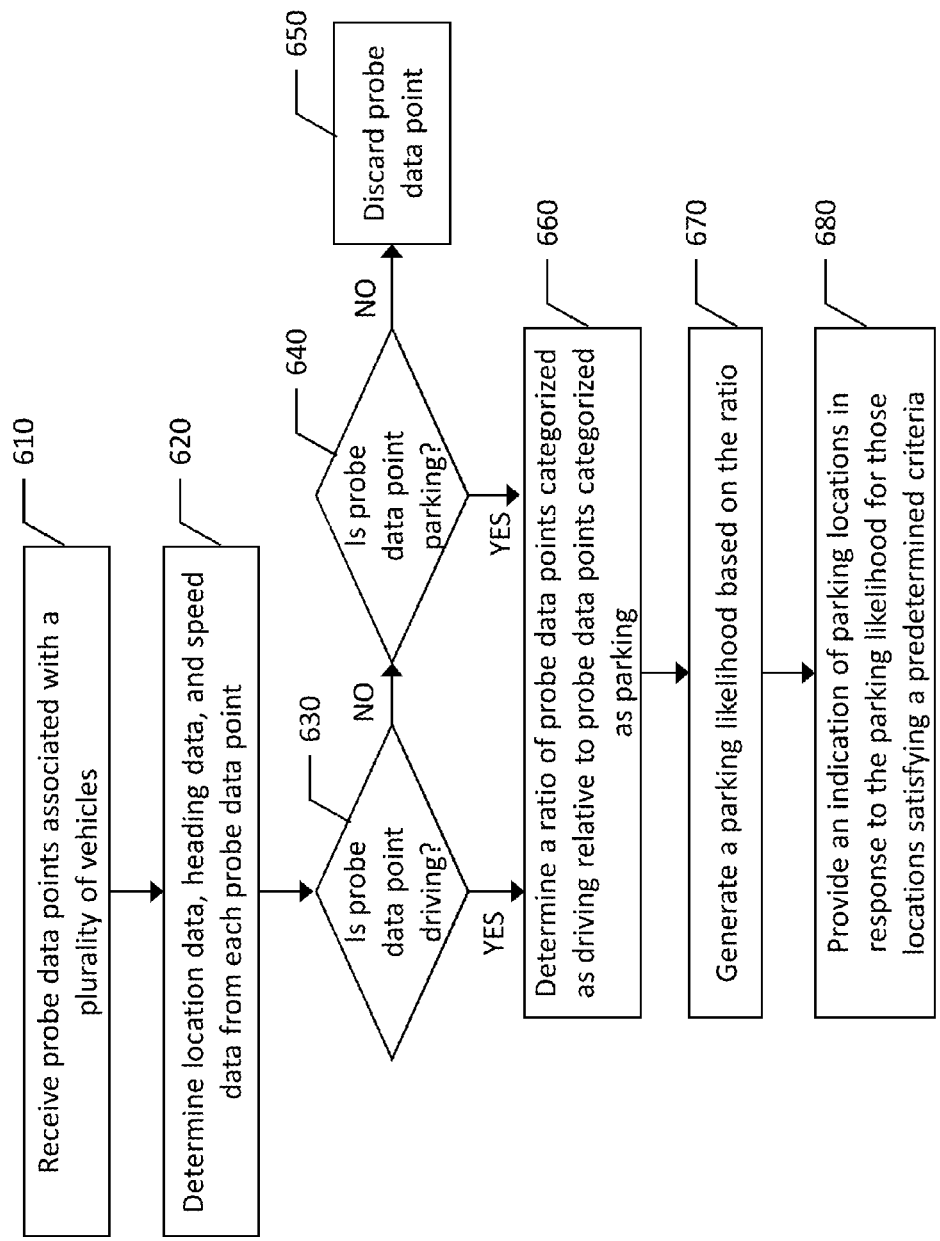

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for determining parking space locations and availability in accordance with an example embodiment of the present invention;

FIG. 3 is a map representation of probe data points including probe heading for a plurality of probes gathered in the region represented by the map according to an example embodiment of the present invention;

FIG. 4 is a map depicting point-locations of parking likelihood based on an analysis of the probe data points of FIG. 3 according to an example embodiment of the present invention;

FIG. 5 is a map depicting parking likelihood along roadways based on an analysis of the probe data points of FIG. 3 according to an example embodiment of the present invention; and FIG. 6 is a flowchart of a method for estimating parking likelihood in an area based on probe data points from that area according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for using observed behavior from vehicles to establish where vehicle parking is available, and estimating the availability of vacant parking spaces based on vehicle probe data. Determining the location of parking lots and on-street parking (e.g., adjacent or along a roadway) can be difficult in environment with which a user is unfamiliar. Users may find themselves driving and searching for parking lots or spaces proximate their destination when they are unfamiliar with an area. This can be frustrating and time consuming.

To provide an improved manner of determining where parking exists, both parking lots and on-street parking, a system as illustrated in FIG. 1, may enable a user to visualize the likelihood of parking. FIG. 1 illustrates a communication diagram of an example embodiment of a system for implementing example embodiments described herein. The illustrated embodiment of FIG. 1 includes a map developer system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. Further, data may be compiled relating to the existence of parking and parking space availability along different road segments of the map database, where a parking availability estimation may be generated in dependence of time of day, day of week, season of the year, special events, etc. Park-in and park-out events, may be established based on the assessment of whether a vehicle is performing a parking maneuver followed by a stop in movement of the probe (park-in) or a vehicle is performing a parking maneuver followed by a continued movement of the probe (park-out), and the relative movement of vehicles performing park-in to performing park-out maneuvers can be used to estimate parking availability. Further, this data can be compiled for temporal clustering of epochs to estimate future parking availability. The navigation-related functions can correspond to vehicle navigation, pedestrian navigation, or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data, directly or indirectly, from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for determining parking likelihood within regions of a map. Parking likelihood is described herein as the likelihood that parking spaces exist at a certain location, whereas parking availability is described as whether or not a portion of those parking spaces may be available (i.e., are not currently occupied). The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for establishing parking likelihood in a particular region based on probe data points from within that region. Vehicle data may be collected through probes which collect data points in the form of an ordered list of GPS (global positioning system) locations where the vehicle has traveled and a time associated with each GPS location. Additional data may be included with probe data, such as vehicle heading, vehicle identification, environmental conditions, or the like; however, for purposes of the invention described herein, the probe data may at least include location, heading, speed, and time, while other data may be superfluous. The time associated with probe data may include date and time, while the GPS location may include coordinates, such as longitude and latitude of the location. The heading may include a compass direction or a degree heading, while the speed may be any unit of measure of the speed of the probe.

Map data, such as the map data contained in map database 108 of the map developer or map service provider 116 may include links, where each roadway in a mapped network comprises a series of interconnected links. Each link is associated with attributes about the geographical segment that they represent. A link may include link geometry data that is a list of coordinates that represent the geographical entity. Links may also include a total length of the geographic segment they represent.

Road segments represented by links can be used in calculating a route or recording a route as traveled. Nodes are end points corresponding to the respective links or segments of the road. Road link data records and node data records may be stored, for example, in map database 108, and may represent a road network. Road links and nodes can be associated with attributes such as geographic coordinates, street names, address ranges, speed limits, turn restrictions at intersections, and other navigation related attributes, as well as points of interest (POIs), such as traffic controls (e.g., stoplights, stop signs, crossings, etc.), fuel stations, hotels, restaurants, museums, stadiums, offices, repair shops, buildings, stores, parks, etc. The map database 108 can include data about places, such as cities, towns, or other communities, and other geographic features, such as bodies of water, mountain ranges, etc. Such place or feature data can be part of POI data or can be associated with POIs or POI data records.

While mapping of elements representing roadways and points of interest may be performed conventionally, example embodiments described herein provide a method of automatically mapping parking lots and street parking spaces through analysis of probe data points from vehicles in a region. Methods described herein capitalize on distinctions between vehicle behaviors (e.g., probe data points) when a vehicle is driving along a road versus parking or performing parking maneuvers. Fundamentally, when a vehicle is parked in a parking lot or performing a parking maneuver such as pulling into a parking space, the heading information from the probe data of that vehicle is often at a different angle than the driving direction heading of a nearby roadway. Further, when the speed of a vehicle slows to below a predefined value, and the heading information from the vehicle deviates from a roadway heading, it may be indicative of the vehicle performing a parking maneuver.

Embodiments described herein calculate a parking likelihood along roads or for point locations. Parking likelihood (L) may be calculated using probe data including probe heading density. Probe heading density for a location may be defined as: n=HD (R, $\vec{p}_i$, $\vec{p}$, θ, $v_{min}$, $v_{max}$) where n is the number of probe data points within a search radius R of the location having heading vector $\vec{p}_i$ with some threshold angle θ with respect to reference heading vector $\vec{p}$, subject to a specified speed range $\{v_{min}, v_{max}\}$. The probe heading density thus gathers the probes that are within a predefined area, having approximately the same heading as a reference heading (e.g., a local heading of a road segment or parking lot parking lane at the location), that are above a minimum speed, and optionally below a maximum speed.

Based upon the above described definition of a heading density, distinctions may be made between heading types— either driving heading density or parking heading density— to enable calculation of a parking likelihood. A driving probe may be distinguished from a parking probe based on one or more factors. For example, a driving probe is likely to have probe data information with a heading that corresponds, within a certain degree of error, to the heading of a local road segment driving direction. A probe having probe data heading information with a heading that does not correspond to a local road segment driving direction is quite possibly parked, or in the process of parking (e.g., performing a parking maneuver). Additionally, probe data speed may be used to aid in distinguishing a parking vehicle from a driving vehicle. Speeds above a predefined threshold may be established as not parked or performing parking maneuvers. For example, a vehicle traveling at 20 kilometers per hour is likely not in the process of parking. Conversely, a vehicle that is traveling at a low speed, which may be below a second, different threshold or the same threshold, may be considered likely to be parking or parked, provided their heading does not align with that of a local road segment (which may indicate slow traffic).

According to embodiments of the present invention, parking likelihood along roads or for point locations may be determined based on probe heading data. The likelihood measures the chaotic orientation of the heading vectors in parking lots as compared to roadways where heading vectors are expected almost exclusively parallel to the local roadway segment direction of travel. FIG. 3, which is presented in color to indicate the probe heading data interpretation, shows traffic probe data. The direction of the probe data heading is shown in color based on a compass direction from 0.10 to 360 degrees. The color legend 310 on the left of the figure illustrates the heading direction in degrees, while the probe data points within the region depicted by the map 300. As shown, vehicles traveling along roadways generally have the same heading according to their probe data, as illustrated by the relatively homogeneous colors of the probe data points along the major roadways 320 and 330. Conversely, the chaotic orientation of the probe data point heading vectors in parking lots do not have a homogeneous color appearance and appear more closely with the chaotic nature of vehicle headings experienced in parking lots.

Probe heading density, specifically driving probe heading density, is a metric that may indicate the amount of probe data points with compatible heading (e.g., within some heading angle threshold with respect to the road heading $\gamma^x$). To determine the local heading direction of a road segment from probe data and a driving direction thereof, a Principal Component Analysis (PCA), which is a dimensionally reduction technique may be used to derive the Principal Components (e.g., the local road segment tangent line). Other techniques may also be used, such as the Robust Statistics line fit technique known as the Least Median of Squares (LMS). However, both of these techniques are point based and do not require heading vector information.

The largest Principal Component $\gamma^x$ indicates the orientation of the majority of probe data points in that region and thus the local orientation of the road segment. While heading data is not necessary for the establishment of the Principal Component heading of segments of the roadways, example embodiments of the present invention take advantage of probe data point heading information to determine the Median Heading Vector. In an example in which the roadway geometry shape is already known, $\gamma^x$ is the road segment heading direction vector. For example, a first derivative if the road is a differentiable curve like a spline, but can also be estimated from a polyline. In order to compute the parking likelihood L∈[0,1], vehicle probe data of driving vehicles is established and distinguished from vehicle probe data of parked vehicles, as described above with respect to heading density related to parking and heading density related to driving. The parking likelihood may then be estimated according to the following:

$$\mathcal{L} = \frac{HD_P}{HD_D + HD_P} \quad (1)$$

Where $HD_P$ is the probe heading density representing vehicle behavior while parking or when parked, and $HD_D$ is the probe heading density representing vehicle behavior while driving.

Since GPS data gathered while a probe is slow or stationary may be noisy, slow moving probes (e.g., probes with speed less than 5 kilometers per hour (kph)) may be excluded when computing a road (or driving) probe heading density $HD_D$. This also applies for parking lanes, which may represent lanes in a parking lot where vehicles may drive in uniform directions at speeds exceeding 5 kph. When computing probe heading density for parking $HD_P$, low and zero-speed probe data points are explicitly included as they may represent vehicle behavior while the vehicle is performing parking maneuvers and while it is parked.

While the focus of embodiments described herein is probe data points representing vehicles, both driving and parking/parked, probe data from mobile devices 114 that are not associated with or no longer associated with vehicles, such as mobile phones, may generate probe data points while a user is in a building, which may resemble parking related probe data. Indoor probes may have almost exclusively low speed probes such that a speed ratio may be derived $\epsilon[0,1]$ to identify indoor probes for exclusion. These probe data points may be identified according to the following:

$$SR = \frac{HD_{NLS}}{HD_{LS} + HD_{NLS}} \quad (2)$$

Where $HD_{NLS}$ represents the heading density of non-low speed probes (e.g., probes with speed greater than, for example, 5 kph) and $HD_{LS}$ represents low speed probes (e.g., speeds between 0 and 5 kph). Thus, if the location contains almost exclusively low speed probes yielding a low value for SR, (e.g., SR<0.1) it is likely an indoor location and the parking likelihood in that area may be set to zero.

Parking likelihood may be refined from the heading vector data illustrated in FIG. 3 to define concise points where it is calculated that the parking likelihood L is above a predefined value. The parking likelihood at concise points 410 depicted on a map 400 that meet the predefined value may be mapped as illustrated in FIG. 4. As shown in FIG. 4, the predefined value of parking likelihood L may be around 0.7. However, this value may be user-defined or may be variable based on machine learning of actual parking likelihood based on vehicle probe data. The parking likelihood L may be visually distinguished and communicated via a color 420 as shown in FIG. 4, with higher likelihood of parking approaching dark blue and violet, while lower parking likelihood is yellow or red. Some parking likelihood data may be erroneous, such as the parking likelihood indicators proximate 430 of FIG. 4. These may be due to GPS error or due to probe data emanating from pedestrians. The erroneous points 430 of FIG. 4 may be inside the footprint of a building as shown in the map view. In some embodiments, the map database 108 may include data indicating the footprint of a building or the footprint of some other point of interest where there would not be parking availability. In such embodiments, parking likelihood calculations that are within such building or point of interest footprints may be excluded as erroneous.

To compute the parking likelihood for road segments (e.g., parking along a roadway) or parking lanes, the parking likelihood may be established every few meters, such as every five meters. Thus, it may be possible to have varying parking likelihood along a road segment. A robust estimate for the parking likelihood for the entire road segment may be derived by taking the median parking likelihood along the road, while excluding parking likelihood next to intersections where vehicles may be stopped and exhibit a spike in parking likelihood for vehicles at a stop sign, traffic light, or making a turn. FIG. 5 illustrates a depiction of parking likelihood as established along road segments and parking lanes. The color bar 510, similar to that of FIG. 4, illustrates a heat map of parking likelihood, with higher likelihood indicated by darker blue or violet, and lower likelihood indicated by yellow or red. The roadway polylines 510 are shown in colors according to the parking likelihood value associated with the roadways. For example, parking likelihood is near zero (in red) for major roadways, while parking likelihood is shown as relatively high (light blue and blue) in parking lanes of parking lots.

The maps of FIGS. 4 and 5 illustrate the parking likelihood of various locations using the parking likelihood ratio described above. The likelihood of parking may be used during development or revision of a map of a map database 108 to establish where parking exists. Parking likelihood that satisfies a predetermined criteria, such as a parking likelihood that exceeds a certain value may be used to establish that parking exists at a certain parking location of a map. The parking locations may be indicated on a map, which may be beneficial during navigation or as a user is approaching their destination. Users may avoid certain roadways near their destination that clearly have no parking locations, while gravitating toward roadways or parking lanes that are established as parking locations based on their parking likelihood.

FIG. 6 illustrates a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a method of estimating parking likelihood in an area based on probe data points from that area. At 610, probe data points from a plurality of vehicles are received. From each of the probe data points, location data, heading data, and speed data are obtained at 620. At 630, it is established whether or not a probe data point is a driving probe data point or not. If not, it is determined at 640 whether the probe data point is a parking probe data point. If the data point is neither a driving probe data point nor a parking probe data point, for example, if the probe data point speed exceeds a predefined rational maximum, then it is discarded at 650. Once the probe data points are categorized at 630 and 640 into parking and driving probe data points, a ratio of probe data points categorized as driving is determined relative to probe data points categorized as parking at 660. Based on this ratio, a parking likelihood is established related to the location of the probe data points. At 680, an indication is provided of parking locations in at least one region of a map based on the parking likelihood for those locations satisfying a predetermined criteria.

In an example embodiment, an apparatus for performing the method of FIG. 6 above may comprise a processor (e.g., the processor 202) configured to perform some or each of the operations (610-680) described above. The processor may, for example, be configured to perform the operations (610-680) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-680 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A mapping system comprising:
   a memory comprising map data; and
   processing circuitry configured to:
   receive probe data points associated with a plurality of vehicles,
   determine location data, heading data, and speed data from each probe data point;
   categorize a probe data point as a driving probe data point in response to the heading data corresponding with heading data of a road segment of the map data proximate to the location data of the probe data point and the speed data of the probe data point being above a predefined value;
   categorize a probe data point as a parking probe data point in response to the heading data failing to correspond with heading data of a road segment proximate to the location data of the probe data point;
   determine a ratio of probe data points categorized as driving relative to probe data points categorized as parking;
   generate a parking likelihood based on the ratio; and
   provide an indication of parking locations in at least one region of a map in response to the parking likelihood for the parking locations satisfying a predetermined criteria.

2. The mapping system of claim 1, wherein categorizing a probe data point as a parking probe data point is performed in response to the speed data of the probe data point being below a second predefined value.

3. The mapping system of claim 1, wherein determining a ratio of probe data points categorized as driving relative to probe data points categorized as parking is performed on probe data points having location data corresponding to within a predetermined radius of a given location.

4. The mapping system of claim 1, wherein the processing circuitry configured to provide an indication of parking locations in at least one region of a map comprises processing circuitry configured to visually distinguish indications of the parking locations based on their respective parking likelihood.

5. The mapping system of claim 4, wherein the visual distinction comprises colors representing the respective parking likelihood.

6. The mapping system of claim 1, wherein determining a ratio of probe data points categorized as driving relative to probe data points categorized as parking comprises dividing a number of probe data points categorized as parking by a total of the number of probe data points categorized as parking and a number of probe data points categorized as driving.

7. The mapping system of claim 1, wherein categorizing a probe data point as a driving probe data point in response to heading data corresponding with heading data of a road segment proximate to the location data of the probe data point comprises categorizing a probe data point as a driving probe data point in response to heading data of the probe data point being within a predefined measure of heading data of a road segment within a predetermined distance from the location data of the probe data point.

8. An apparatus comprising at least one processor and at least one memory including computer program code, the at least one memory and computer program code configured to, with the processor, cause the apparatus to at least:
   receive probe data points associated with a plurality of vehicles,
   determine location data, heading data, and speed data from each probe data point;
   categorize a probe data point as a driving probe data point in response to the heading data corresponding with heading data of a road proximate the location data of the probe data point and the speed data of the probe data point being above a predefined value;
   categorize a probe data point as a parking probe data point in response to the heading data failing to correspond with heading data of a road proximate the location data of the probe data point;
   determine a ratio of probe data points categorized as driving relative to probe data points categorized as parking;

generate a parking likelihood based on the ratio; and
provide an indication of parking locations in at least one region of a map in response to the parking likelihood for the parking locations satisfying a predetermined criteria.

9. The apparatus of claim 8, wherein causing the apparatus to categorize a probe data point as a parking probe data point is performed in response to the speed data of the probe data point being below a second predefined value.

10. The apparatus of claim 8, wherein causing the apparatus to determine a ratio of probe data points categorized as driving relative to probe data points categorized as parking is performed on probe data points having location data corresponding to within a predetermined radius of a given location.

11. The apparatus of claim 8, wherein causing the apparatus to provide an indication of parking locations in at least one region of a map comprises causing the apparatus to visually distinguish indications of the parking locations based on their respective parking likelihood.

12. The apparatus of claim 11, wherein the visual distinction comprises colors representing the respective parking likelihood.

13. The apparatus of claim 8, wherein causing the apparatus to determine a ratio of probe data points categorized as driving relative to probe data points categorized as parking comprises causing the apparatus to divide a number of probe data points categorized as parking by a total of the number of probe data points categorized as parking and a number of probe data points categorized as driving.

14. The apparatus of claim 8, wherein causing the apparatus to categorize a probe data point as a driving probe data point in response to heading data corresponding with heading data of a road segment proximate to the location data of the probe data point comprises causing the apparatus to categorize a probe data point as a driving probe data point in response to heading data of the probe data point being within a predefined measure of heading data of a road segment within a predetermined distance from the location data of the probe data point.

15. A computer program product comprising at least one non-transitory computer-readable storage medium having computer-executable program code portions stored therein, the computer-executable program code portions comprising program code instructions configured to:
receive probe data points associated with a plurality of vehicles,
determine location data, heading data, and speed data from each probe data point;
categorize a probe data point as a driving probe data point in response to the heading data corresponding with heading data of a road proximate the location data of the probe data point and the speed data of the probe data point being above a predefined value;
categorize a probe data point as a parking probe data point in response to the heading data failing to correspond with heading data of a road proximate the location data of the probe data point;
determine a ratio of probe data points categorized as driving relative to probe data points categorized as parking;
generate a parking likelihood based on the ratio; and
provide an indication of parking locations in at least one region of a map in response to the parking likelihood for the parking locations satisfying a predetermined criteria.

16. The computer program product of claim 15, wherein the program code instructions to categorize a probe data point as a parking probe data point are performed in response to the speed data of the probe data point being below a second predefined value.

17. The computer program product of claim 15, wherein the program code instructions to determine a ratio of probe data points categorized as driving relative to probe data points categorized as parking are performed on probe data points having location data corresponding to within a predetermined radius of a given location.

18. The computer program product of claim 15, wherein the program code instructions to provide an indication of parking locations in at least one region of a map comprise program code instructions to visually distinguish indications of the parking locations based on their respective parking likelihood.

19. The computer program product of claim 18, wherein the visual distinction comprises colors representing the respective parking likelihood.

20. The computer program product of claim 15, wherein the program code instructions to determine a ratio of probe data points categorized as driving relative to probe data points categorized as parking comprises program code instructions to divide the number of probe data points categorized as parking by a total of the number of probe data points categorized as parking and a number of probe data points categorized as driving.

21. The computer program product of claim 15, wherein the program code instructions to categorize a probe data point as a driving probe data point in response to heading data corresponding with heading data of a road segment proximate to the location data of the probe data point comprises program code instructions to categorize a probe data point as a driving probe data point in response to heading data of the probe data point being within a predefined measure of heading data of a road segment within a predetermined distance from the location data of the probe data point.

22. A method for determining parking likelihood, wherein the method is implemented by a processor including memory and computer program code, the method comprising:
receiving probe data points associated with a plurality of vehicles;
determining location data, heading data, and speed data from each probe data point;
categorizing a probe data point as a driving probe data point in response to the heading data corresponding with heading data of a road proximate the location data of the probe data point and the speed data of the probe data point being above a predefined value;
categorizing a probe data point as a parking probe data point in response to the heading data failing to correspond with heading data of a road proximate the location data of the probe data point;
determining a ratio of probe data points categorized as driving relative to probe data points categorized as parking;
generating a parking likelihood based on the ratio; and
providing an indication of parking locations in at least one region of a map in response to the parking likelihood for the parking locations satisfying a predetermined criteria.

23. The method of claim 22, wherein categorizing a probe data point as a parking probe data point is performed in response to the speed data of the probe data point being below a second predefined value.

24. The method of claim 22, wherein determining a ratio of probe data points categorized as driving relative to probe data points categorized as parking is performed on probe data points having location data corresponding to within a predetermined radius of a given location.

25. The method of claim 22, wherein providing an indication of parking locations in at least one region of a map comprises visually distinguishing indications of the parking locations based on the parking likelihood.

26. The method of claim 25, wherein the visual distinction comprises colors representing the respective parking likelihood.

27. The method of claim 22, wherein determining a ratio of probe data points categorized as driving relative to probe data points categorized as parking comprises dividing a number of probe data points categorized as parking by a total of the number of probe data points categorized as parking and a number of probe data points categorized as driving.

28. The method of claim 22, wherein categorizing a probe data point as a driving probe data point in response to heading data corresponding with heading data of a road segment proximate to the location data of the probe data point comprises categorizing a probe data point as a driving probe data point in response to heading data of the probe data point being within a predefined measure of heading data of a road segment within a predetermined distance from the location data of the probe data point.

\* \* \* \* \*